(12) United States Patent
Nomaru (10) Patent No.: US 11,255,657 B2
(45) Date of Patent: Feb. 22, 2022

(54) IMAGE CAPTURING APPARATUS WITH OPTICAL FIBER LOCATED INSIDE MINUTE HOLE IN OBJECTIVE LENS

(71) Applicant: DISCO CORPORATION, Tokyo (JP)

(72) Inventor: Keiji Nomaru, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 0 days.

(21) Appl. No.: 17/087,799

(22) Filed: Nov. 3, 2020

(65) Prior Publication Data

US 2021/0140756 A1    May 13, 2021

(30) Foreign Application Priority Data

Nov. 13, 2019  (JP) .............................. JP2019-205578

(51) Int. Cl.
*G01B 11/02* (2006.01)
*G01B 9/02015* (2022.01)
*G01B 11/06* (2006.01)

(52) U.S. Cl.
CPC .......... *G01B 11/022* (2013.01); *G01B 9/0203* (2013.01); *G01B 11/06* (2013.01); *G01B 11/0608* (2013.01)

(58) Field of Classification Search
CPC .... G01B 11/022; G01B 9/0203; G01B 11/06; G01B 11/0608; G01B 11/0625; G01B 11/0675; H04N 5/2256; H04N 5/2257; H04N 5/23212; H04N 5/2254; H01L 22/00; G02B 6/32; G02B 6/262; G02B 6/125; G02B 6/1245; G02B 6/0005; G02B 1/041; G02B 6/0001
See application file for complete search history.

(56) References Cited

U.S. PATENT DOCUMENTS 5,289,004 A * 2/1994 Okada .................. G01Q 10/065
250/423 F
5,548,113 A * 8/1996 Goldberg ............... B82Y 35/00
250/234

(Continued)

FOREIGN PATENT DOCUMENTS

JP            61198204 A    9/1986
JP         2011122894 A    6/2011
JP         2012002604 A    1/2012

*Primary Examiner* — Michael P LaPage
(74) *Attorney, Agent, or Firm* — Greer, Burns & Crain, Ltd.

(57) ABSTRACT

An image capturing apparatus for capturing an image of a workpiece held on a chuck table includes a camera, an objective lens having a minute hole defined centrally therein and disposed in facing relation to the workpiece held on the chuck table, an optical fiber having an end inserted in the minute hole in the objective lens, a light source optically coupled to another end of the optical fiber, and a beam splitter disposed in the optical fiber for branching off returning light reflected by the workpiece held on the chuck table. The image capturing apparatus further includes a calculating section for calculating a value representing a height or a thickness of the workpiece on the basis of the returning light branched off by the beam splitter, and a focusing mechanism for focusing the objective lens on the workpiece on the basis of the value calculated by the calculating section.

14 Claims, 4 Drawing Sheets

(56) References Cited

U.S. PATENT DOCUMENTS

| | | | |
|---|---|---|---|
| 7,808,699 B2* | 10/2010 | Ulrich | G02B 21/08 359/385 |
| 2011/0261371 A1* | 10/2011 | Schoenleber | H01L 21/67253 356/630 |
| 2012/0020618 A1* | 1/2012 | Erdman | G02B 6/3851 385/33 |
| 2014/0299586 A1 | 10/2014 | Sawabe et al. | |
| 2019/0137776 A1* | 5/2019 | Ryu | G02B 27/14 |

* cited by examiner

IMAGE CAPTURING APPARATUS WITH OPTICAL FIBER LOCATED INSIDE MINUTE HOLE IN OBJECTIVE LENS

BACKGROUND OF THE INVENTION

Field of the Invention

The present invention relates to an image capturing apparatus that includes a chuck table for holding a workpiece thereon and an image capturing unit for capturing an image of the workpiece held on the chuck table.

Description of the Related Art

Wafers with a plurality of devices such as integrated circuits (ICs), large-scale integration (LSI) circuits, formed in respective areas that are demarcated on a face side thereof by a plurality of intersecting projected dicing lines are divided by a dicing apparatus or a laser processing apparatus into individual device chips which will be used in electric appliances such as mobile phones and personal computers.

The dicing apparatus and the laser processing apparatus incorporate an image capturing apparatus having an automatic focusing function to capture an image of a wafer and detect a region thereof that is to be processed (see, for example, JP Sho 61-198204A).

According to the technology disclosed in JP Sho 61-198204A, while an image capturing unit included in the image capturing apparatus is moving at predetermined pitches with respect to a workpiece, i.e., a wafer, the image capturing unit captures images of the workpiece at the respective pitches, and the captured images are stored as image information in a control unit. The control unit then determines differential values of sampled points that make up the captured regions of the images corresponding to the pitches, and decides that the position of the image capturing unit where the image with the largest differential value is obtained represents a focused position, i.e., a just focused position.

SUMMARY OF THE INVENTION

The conventional image capturing apparatus described above operates by intermittently moving an objective lens assembly of the image capturing unit at predetermined pitches, capturing images of the workpiece at the respective pitches, sending each of the captured images as image information to the control unit, determining differential values of sampled points that make up the captured regions of the images corresponding to the pitches, and specifying the position of the objective lens assembly for capturing an image of the workpiece as a focused position. Therefore, it takes time until the image capturing apparatus brings the objective lens assembly into focus and detects a region to be processed after the image capturing unit has obtained images, and hence the image capturing apparatus is of poor productivity.

It is therefore an object of the present invention to provide an image capturing apparatus that is capable of immediately focusing an objective lens assembly on a workpiece.

In accordance with an aspect of the present invention, there is provided an image capturing apparatus for capturing an image of a workpiece held on a chuck table, including a camera, an objective lens having a minute hole defined centrally therein and disposed in facing relation to the workpiece held on the chuck table, an optical fiber having an end inserted in the minute hole in the objective lens, a light source optically coupled to another end of the optical fiber, a beam splitter disposed in the optical fiber for branching off returning light reflected by the workpiece held on the chuck table, a calculating section for calculating a value representing a height or a thickness of the workpiece on a basis of the returning light branched off by the beam splitter, and a focusing mechanism for focusing the objective lens on the workpiece on a basis of the value calculated by the calculating section.

Preferably, the light source is selected from a group consisting of a super luminescent diode light source, an amplified spontaneous emission light source, a super continuum light source, a light emitting diode light source, a halogen light source, a xenon light source, a mercury light source, a metal halide light source, and a laser light source. Preferably, the calculating section includes a diffraction grating for diffracting a spectral interference waveform of the returning light, and an image sensor for capturing an image of the light diffracted into wavelengths by the diffraction grating, and determines the height or the thickness of the workpiece by calculating intensities of the light respectively at the frequencies generated by the image sensor.

According to the present invention, it is not necessary to move an image capturing unit with respect to the workpiece at predetermined pitches, capture images of the workpiece respectively at the predetermined pitches, and determine differential values with respect to the respective images in order to focus the image capturing unit on a face side of the workpiece. Instead, according to the above embodiment, the objective lens can quickly be focused on the face side of the workpiece on the basis of the height or the thickness calculated by the calculating section.

The above and other objects, features and advantages of the present invention and the manner of realizing them will become more apparent, and the invention itself will best be understood from a study of the following description and an appended claim with reference to the attached drawings showing a preferred embodiment of the invention.

DETAILED DESCRIPTION OF THE PREFERRED EMBODIMENT

Figure 1:
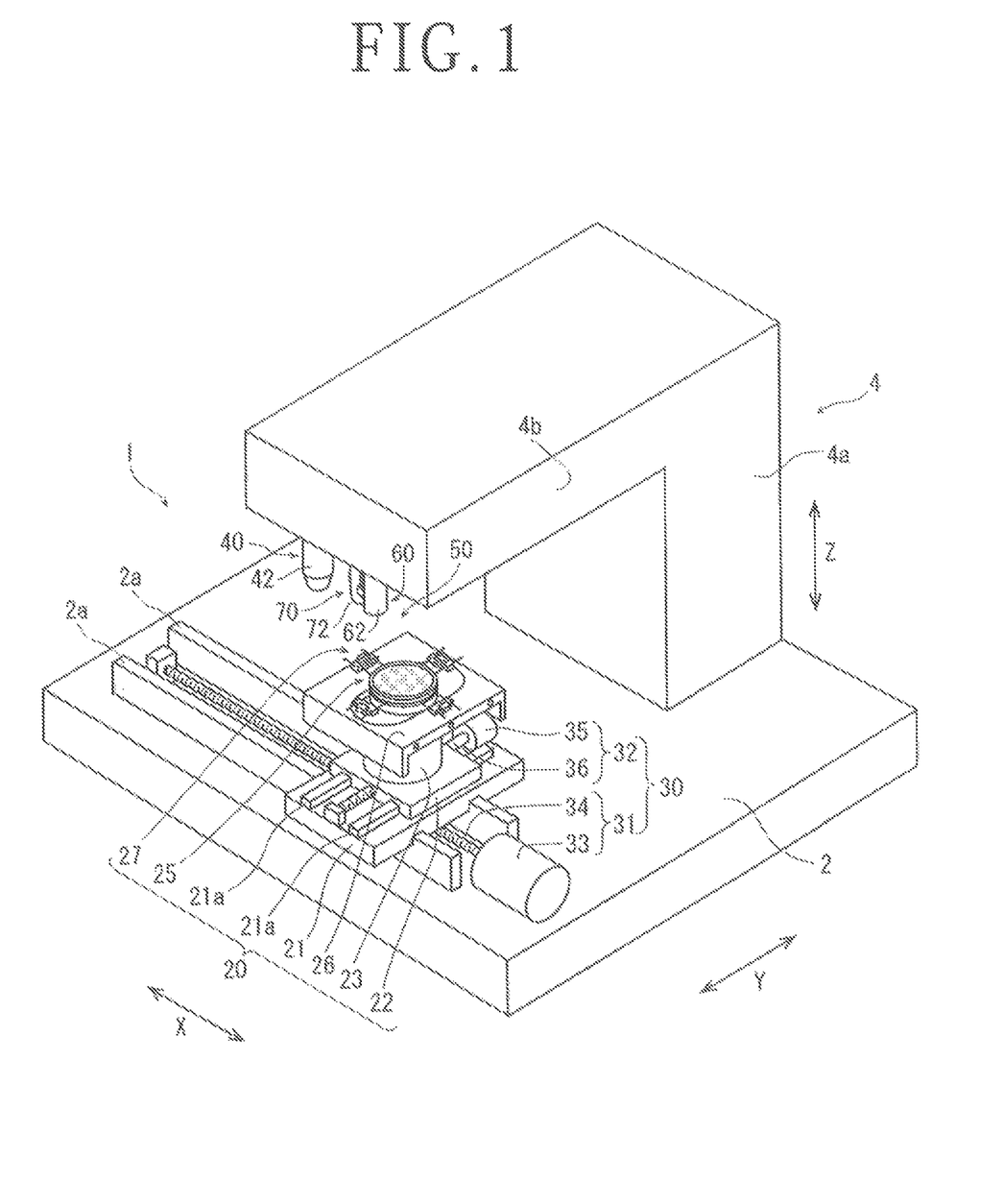
FIG. 1 is a perspective view of a laser processing apparatus incorporating an image capturing apparatus according to an embodiment of the present invention.

An image capturing apparatus according to an embodiment of the present invention will hereinafter be described in detail with reference to the drawings. FIG. 1 illustrates in perspective a laser processing apparatus 1 including an image capturing apparatus, denoted by 50, according to the present embodiment. As illustrated in FIG. 1, the image capturing apparatus 50 that is included in the laser processing apparatus 1 includes a holding unit 20 for holding a workpiece thereon and an image capturing unit 60 for capturing an image of the workpiece held on the holding unit 20. The laser processing apparatus 1 further includes, in addition to the image capturing apparatus 50, a moving mechanism 30 for moving the holding unit 20 and a laser beam applying unit 40 for applying a laser beam to the workpiece held on the holding unit 20.

Figure 2:
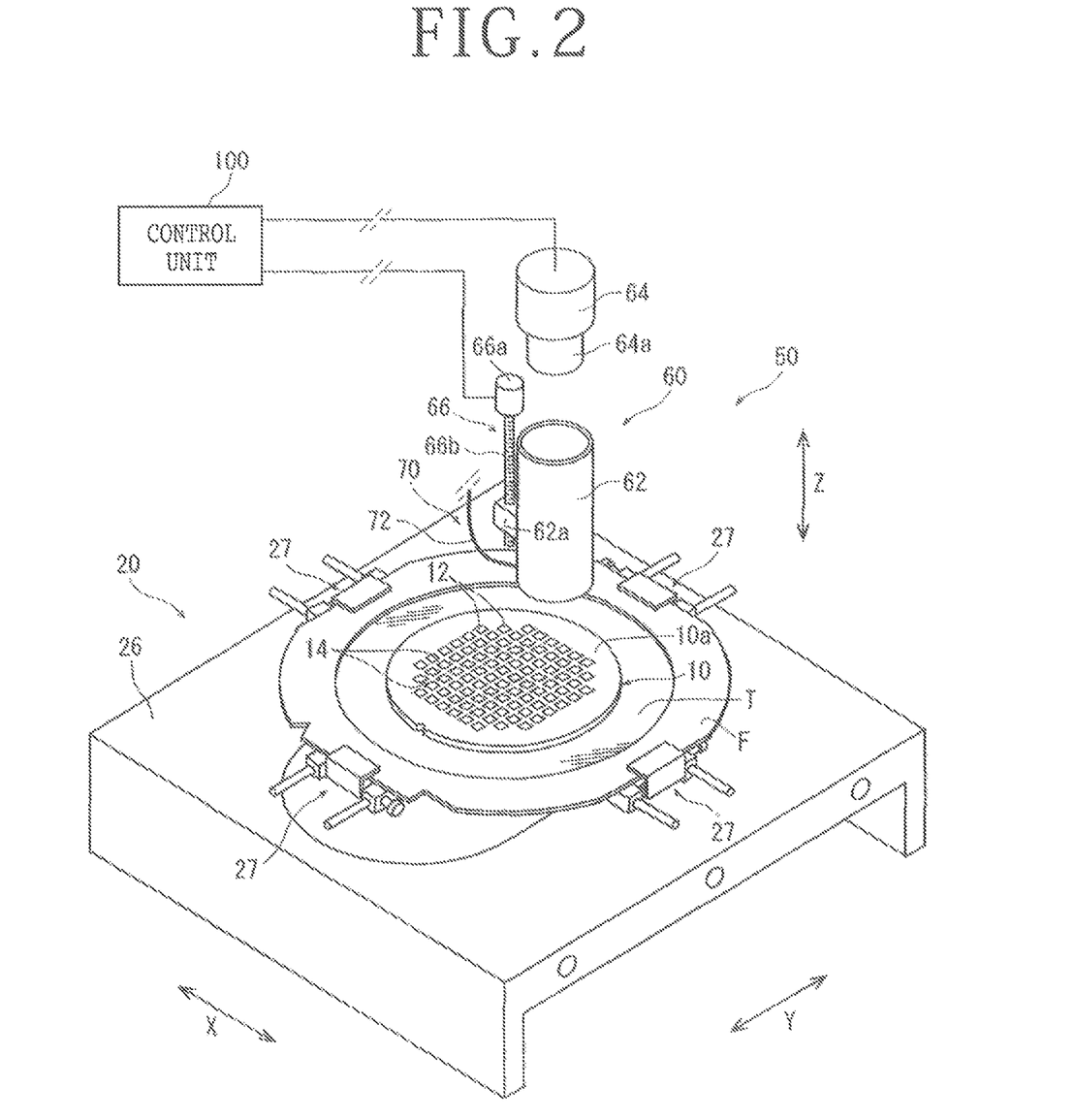
FIG. 2 is an enlarged perspective view of the image capturing apparatus illustrated in FIG. 1.

The holding unit 20 includes a rectangular X-axis movable plate 21 movably placed on a base table 2 for movement in X-axis directions indicated by an arrow X, a rectangular Y-axis movable plate 22 movably placed on the X-axis movable plate 21 for movement in Y-axis directions indicated by an arrow Y, a hollow cylindrical post 23 fixed to an upper surface of the Y-axis movable plate 22, and a rectangular cover plate 26 fixed to an upper end of the post 23. A circular chuck table 25 is mounted on the cover plate 26 and extends upwardly through an oblong hole defined in the cover plate 26. The chuck table 25 is rotatable about its own axis by a rotating mechanism, not illustrated. The chuck table 25 has an upper surface acting as an air-permeable holding surface made of a porous material and connected to suction means, not illustrated, through a fluid channel extending through the post 23. A plurality of clamps 27 (see also FIG. 2) for securing an annular frame F that supports the workpiece through a protective tape T are mounted on the chuck table 25. According to the present embodiment, as illustrated in FIG. 2, the workpiece is in the form of a wafer 10 having a plurality of devices 12 formed in respective areas demarcated on a face side 10a thereof by a plurality of intersecting projected dicing lines 14, for example.

As illustrated in FIG. 1, the moving mechanism 30 is disposed on the base table 2 and includes an X-axis feed mechanism 31 for processing-feeding the holding unit 20 in the X-axis directions and a Y-axis feed mechanism 32 for indexing-feeding the Y-axis movable plate 22 in the Y-axis directions. The X-axis feed mechanism 31 converts rotary motion of a stepping motor 33 to linear motion through a ball screw 34 and transmits the linear motion to the X-axis movable plate 21, moving the X-axis movable plate 21 in one of the X-axis directions or the other along a pair of guide rails 2a mounted on the base table 2. The Y-axis feed mechanism 32 converts rotary motion of a stepping motor 35 to linear motion through a ball screw 36 and transmits the linear motion to the Y-axis movable plate 22, moving the Y-axis movable plate 22 in one of the Y-axis directions or the other along a pair of guide rails 21a mounted on the X-axis movable plate 21. Although not illustrated, position detecting means are disposed respectively on the X-axis feed mechanism 31, the Y-axis feed mechanism 32, and the chuck table 25. The position detecting means accurately detect a position of the chuck table 25 in the X-axis directions, a position of the chuck table 25 in the Y-axis directions, and an angular position of the chuck table 25 about its central axis, and sends the detected positions to a control unit 100 (see FIGS. 2 and 3) to be described later. The X-axis feed mechanism 31, the Y-axis feed mechanism 32, and the rotating mechanism of the chuck table 25 are actuated by command signals from the control unit 100 to position the chuck table 25 in a desired coordinate position in the X- and Y-axis directions and a desired angular position.

As illustrated in FIG. 1, a frame body 4 is erected on the base table 2 laterally of the moving mechanism 30. The frame body 4 includes a vertical wall 4a disposed on the base table 2 and a horizontal wall 4b extending horizontally from an upper end of the vertical wall 4a. The horizontal wall 4b of the frame body 4 houses an optical system, not illustrated, of the laser beam applying unit 40. The laser beam applying unit 40 includes a beam condenser 42 disposed on a lower surface of a distal end portion of the horizontal wall 4b. The beam condenser 42 houses a condensing lens, not illustrated, etc., therein. The laser beam applying unit 40 also includes a laser oscillator, not illustrated, that emits a laser beam that is converged by the condensing lens of the beam condenser 42 onto a predetermined position on the workpiece held on the holding unit 20.

Figure 3:
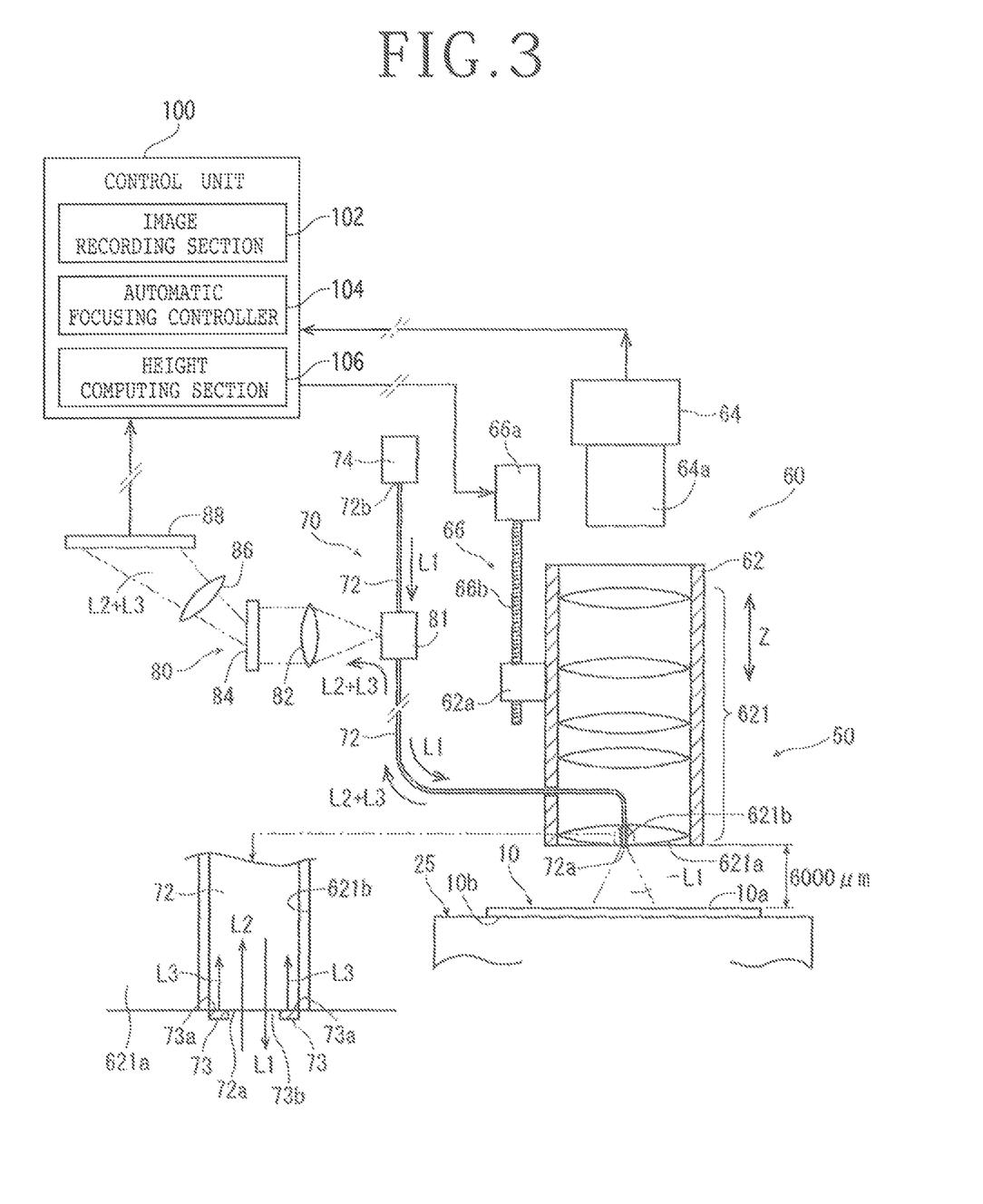
FIG. 3 is a side elevational view, partly in cross section, illustrating a configuration of the image capturing apparatus illustrated in FIG. 2, with a calculating section illustrated in block form.

The image capturing apparatus 50 according to the present embodiment that includes the holding unit 20 and the image capturing unit 60 will hereinafter be described below with reference to FIGS. 2 and 3. FIG. 2 illustrates in perspective at an enlarged scale the image capturing apparatus 50 that includes the holding unit 20 and the image capturing unit 60 for capturing an image of the wafer 10 held on the holding unit 20. FIG. 3 illustrates in side elevation partly in cross section specific structural details of the image capturing apparatus 50 illustrated in FIG. 2, with a calculating section illustrated in block form.

The image capturing unit 60 included in the image capturing apparatus 50 includes an objective lens casing 62 and a camera 64 for capturing an image of the face side 10a of the wafer 10 held on the holding unit 20 from above the objective lens casing 62 through the objective lens casing 62. The camera 64 includes a focusing optical system 64a and has a function to capture an image of the face side 10a of the wafer 10 with a visible beam. As illustrated in FIG. 3, the objective lens casing 62 houses an objective lens assembly 621 therein. According to the illustrated embodiment, the objective lens assembly 621 includes an array of convex lenses, for example. According to the present invention, however, the objective lens assembly 621 is not limited to the illustrated makeup, but may be a single convex lens or a combination of convex and concave lenses.

As illustrated in FIG. 3, an illuminating device 70 is mounted on the image capturing apparatus 50 according to the present embodiment. The illuminating device 70 includes an optical fiber 72 and a light source 74. The optical fiber 72 has a lower end portion inserted into the objective lens casing 62 and having an end 72a inserted in a minute hole 621b defined centrally in a convex lens 621a that is one of the lenses of the objective lens assembly 621 that is located in the lowermost position and faces the wafer 10 held under suction on the chuck table 25. The optical fiber 72 has another end 72b optically coupled to the light source 74, so that light L1 emitted from the light source 74 can be introduced into the optical fiber 72 from the another end 72b. According to the present embodiment, the light L1 emitted from the light source 74 is white light including lights having wavelengths ranging from 100 to 900 nm, for example. A diameter of the optical fiber 72 and an inner diameter of the minute hole 621b in the convex lens 621a should preferably be as small as possible. Specifically, the diameter of the optical fiber 72 is of approximately 50 μm, for example, and the inner diameter of the minute hole 621b is slightly larger than the diameter of the optical fiber 72 and ranges from approximately 51 to 53 μm, for example.

The end 72a of the optical fiber 72 according to the present embodiment has a lower end face with a reflective film 73 disposed thereon, as illustrated at an enlarged scale in a lower left portion of FIG. 3. The reflective film 73 is in the form of a ring film having an outside diameter of 50 μm that is the same as the diameter of the optical fiber 72. The ring film of the reflective film 73 has a width of approximately 10 μm and includes a circular opening 73b defined centrally therein that has a diameter of 30 μm. The reflective film 73 has a reflective surface 73a held against the lower end face of the end 72a of the optical fiber 72, the reflective surface 73a for reflecting the light L1 introduced from the light source 74 into the optical fiber 72 and reaching the end 72a. The light L1 that has reached the reflective surface 73a of the reflective film 73 is reflected thereby and travels back as reflected light L3 in the optical fiber 72. The light source 74 may be selected from a variety of light sources including, for example, a super luminescent diode (SLD) light source, an amplified spontaneous emission (ASE) light source, a super continuum light source, a light emitting diode (LED) light source, a halogen light source, a xenon light source, a mercury light source, a metal halide light source, and a laser light source, and may not necessarily be a light source for emitting white light.

Moreover, the image capturing apparatus 50 includes an automatic focusing mechanism 66 for vertically moving the objective lens casing 62 in Z-axis directions, i.e., vertical directions, indicated by an arrow Z in FIG. 3 to perform focus adjustment. The automatic focusing mechanism 66 includes a stepping motor 66a and an externally threaded rod 66b coupled to the output shaft of the stepping motor 66a. The externally threaded rod 66b is threaded through an internally threaded surface, not illustrated, of a joint 62a fixedly disposed on the objective lens casing 62. When the stepping motor 66a is energized to rotate the externally threaded rod 66b about its central axis in one direction or the other by a command signal from the control unit 100, the objective lens casing 62 that is vertically movably supported below the lower surface of the horizontal wall 4b is vertically moved to a desired position in one of the Z-axis directions indicated by the arrow Z. The image capturing unit 60 of the image capturing apparatus 50 according to the present embodiment is preset to be focused at a position that is spaced 5000 μm from the lower end face of the objective lens casing 62. The focused position is stored in a random access memory (RAM) of the control unit 100. Since the focused position of the objective lens casing 62 varies depending on the height or vertical position of the face side 10a of the wafer 10, i.e., the workpiece, it is necessary to vertically move the position of the objective lens casing 62 with the automatic focusing mechanism 66 in order to focus the image capturing unit 60 on the face side 10a of the wafer 10. The camera 64 and the automatic focusing mechanism 66 are fixed in position by fixing means, not illustrated, within the horizontal wall 4b of the frame body 4 and near the lower surface of the distal end portion of the horizontal wall 4b. In FIG. 3, the protective tape T and the annular frame F that support the wafer 10 are omitted from illustration.

A beam splitter 81 is disposed on the path of the optical fiber 72 of the illuminating device 70 described above. The beam splitter 81 may be a polarization-holding fiber circulator, a polarization-holding fiber coupler, or the like, for example. The beam splitter 81 branches off returning light (L2+L3) that has traveled back in the optical fiber 72 and guides the returning light (L2+L3) to a calculating section 80 for calculating the height and the thickness of the wafer 10. The returning light (L2+L3) includes reflected light L2 that includes lights reflected by the face side 10a of the wafer 10 held on the holding unit 20 and a reverse side 10b thereof and reflected light L3 reflected by the reflective surface 73a of the reflective film 73 and acting as a reference not affected by the distance between the wafer 10 and the objective lens casing 62. The calculating section 80 includes a collimation lens 82 for converting the returning light (L2+L3) branched off by the beam splitter 81 into parallel light, a diffraction grating 84 for diffracting the returning light (L2+L3) into wavelengths and outputting the diffracted returning light (L2+L3), a condensing lens 86 for rendering the returning light (L2+L3) diffracted by the diffraction grating 84 convergent, and an image sensor 88 for capturing an image of the returning light (L2+L3) rendered convergent by the condensing lens 86. The image sensor 88 is a sensor including a linear array of image capturing elements, not illustrated, for capturing images of the returning light (L2+L3) diffracted by the diffraction grating 84 at the respective wavelengths. The image sensor 88 may be a line image sensor, for example. An image signal generated by the image sensor 88 is output to the control unit 100.

The control unit 100 is constructed as a computer and includes a central processing unit (CPU) for performing arithmetic processing operations according to control programs, a read only memory (ROM) for storing the control programs, etc., a read/write RAM for temporarily storing image information from the camera 64 and the results of the arithmetic processing operations, etc., an input interface, and an output interface. The details of these components of the control unit 100 are omitted from illustration. The control unit 100 functions as a control unit for controlling the operable components, described above, of the laser processing apparatus 1. In addition, the control unit 100 includes an image recording section 102 for recording images captured by the camera 64, an automatic focusing controller 104 for issuing a command signal for controlling the automatic focusing mechanism 66 described above, and a height computing section 106 for computing the height and the thickness of the wafer 10 on the basis of the returning lines (L2+L3) branched off by the beam splitter 81.

The laser processing apparatus 1 that includes the image capturing apparatus 50 according to the present embodiment is generally constructed as described above. Operation of the laser processing apparatus 1 will be described below. For processing the wafer 10 with a laser beam, the wafer 10 held on the holding unit 20 is moved by the moving mechanism 30 to a position directly below the image capturing unit 60, as illustrated in FIG. 2. After the wafer 10 has been positioned directly below the objective lens casing 62 of the image capturing unit 60, an alignment process is carried out to detect a region of the wafer 10, i.e., one of the projected dicing lines 14, where the face side 10a of the wafer 10 is to be imaged and processed. At this time, it is preferable to position an outer circumferential excess region of the wafer 10 which is free of devices 12 directly below the objective lens casing 62 because for measuring the thickness of the wafer 10, it is necessary to reflect light from the reverse side 10b of the wafer 10, but the region of the wafer 10 where the devices 12 are formed is unable to reflect light from the reverse side 10b of the wafer 10 in some cases.

For carrying out the alignment process, the automatic focusing mechanism 66 is actuated to position the objective lens casing 62 at a predetermined height. The predetermined height is not limited to any particular height, but may be any height. Then, the light source 74 is energized. When the light source 74 is energized, the light source 74 emits light L1 that is introduced into the optical fiber 72 from the another end 72b thereof and travels through the optical fiber 72 to the end 72a thereof. Since, as described above, the end 72a of the optical fiber 72 is inserted in the minute hole 621b defined centrally in the convex lens 621a that is one of the lenses of the objective lens assembly 621 that is located in the lowermost position and faces the wafer 10, the end 72a of the optical fiber 72 acts as a point light source. The light L1 then spreads conically from the end 72a of the optical fiber 72 in the center of the convex lens 621a and is applied to the face side 10a of the wafer 10.

The light L1 applied to the face side 10a of the wafer 10 is reflected by the face side 10a of the wafer 10 and the reverse side 10b of the wafer 10 as the reflected light L2, which is introduced through the opening 73b in the reflective film 73 into the optical fiber 72. The reflected light L2 and the reflected light L3 that is produced by the light L1 reflected by the reflective surface 73a of the reflective film 73 on the end 72a of the optical fiber 72 make up the returning light (L2+L3), which travels back in the optical fiber 72.

Figure 4A:
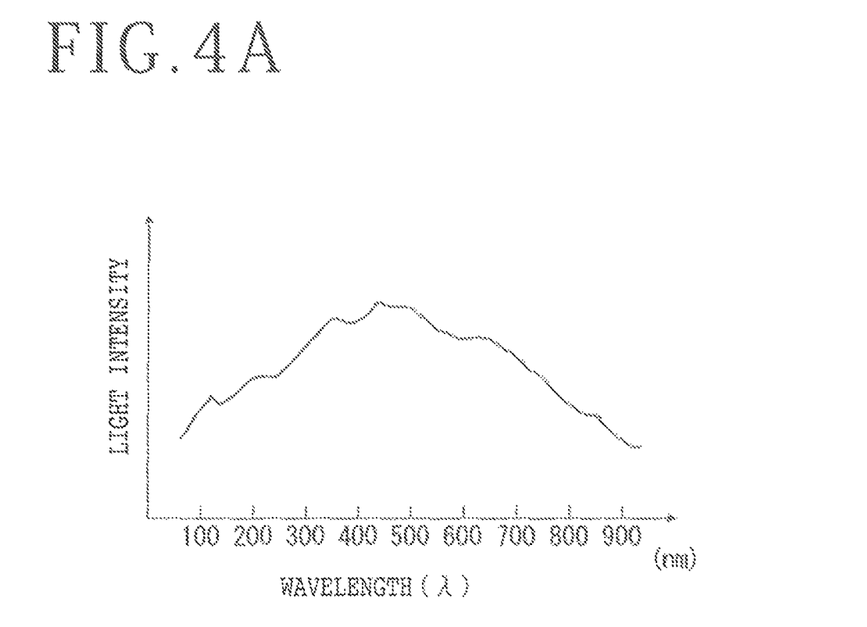
FIG. 4A is a diagram illustrating a spectral interference waveform determined by the calculating section illustrated in FIG. 3.

The returning light (L2+L3) traveling back in the optical fiber 72 is branched off into the calculating section 80 by the beam splitter 81. The returning light (L2+L3) branched off into the calculating section 80 is guided through the collimation lens 82 to the diffraction grating 84, which diffracts the returning light (L2+L3) into wavelengths. The returning light (L2+L3) diffracted into wavelengths is applied to the image sensor 88. The image sensor 88 captures an image of the diffracted returning light (L2+L3) and outputs image information of the captured image to the control unit 100. The height computing section 106 of the control unit 100 computes light intensities of the frequencies of the diffracted returning light (L2+L3) on the basis of the image information supplied to the control unit 100, and forms and outputs a spectral interference waveform. FIG. 4A illustrates the spectral interference waveform of the image of the diffracted returning light (L2+L3) captured by the image sensor 88. FIG. 4A has a horizontal axis representing the wavelength and a vertical axis representing the light intensity.

Figure 4B:
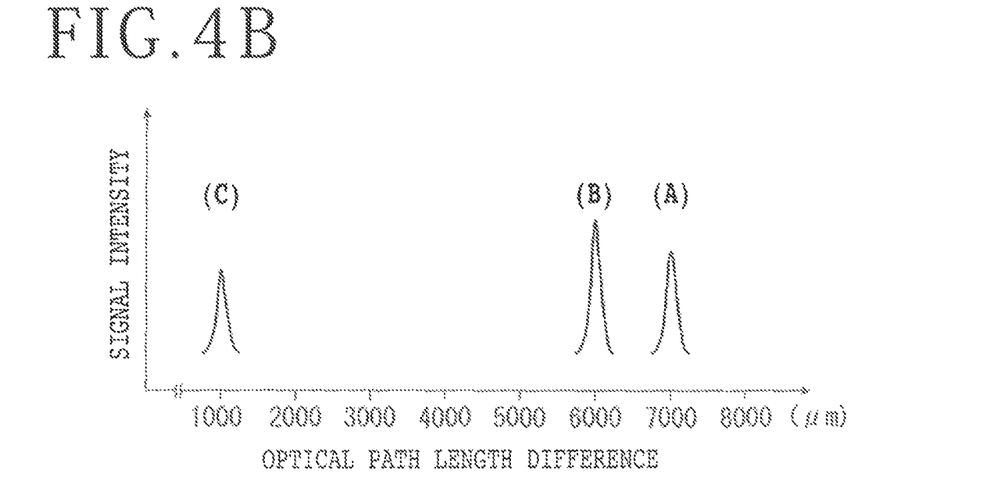
FIG. 4B is a diagram illustrating the relationship between optical path length differences and signal intensities, obtained by a waveform analysis conducted on the spectral interference waveform by the calculating section.

On the basis of the spectral interference waveform formed by the height computing section 106 from the image of the diffracted returning light (L2+L3) captured by the image sensor 88, the height computing section 106 of the control unit 100 performs a waveform analysis according to a Fourier transform theory and a wavelet transform theory based on the spectral interference waveform and a theoretical waveform function. The waveform analysis is able to obtain a waveform of signal intensities as illustrated in FIG. 4B on the basis of a spectral interference caused by optical path length differences between the reflected light L3 acting as a reference whose optical path length remains unchanged regardless of the position of the objective lens casing 62 and the reflected light L2 whose optical path length changes depending on the thickness of the wafer 10 and the position of the objective lens casing 62. According to the waveform illustrated in FIG. 4B, strong-intensity signals appear at an optical path length difference of 7000 µm, i.e., at a position indicated by (A), an optical path length difference of 6000 µm, i.e., at a position indicated by (B), and an optical path length difference of 1000 µm, i.e., at a position indicated by (C).

The signal intensity waveform illustrated at the position (A) represents the distance between the lens 621 in the objective lens casing 62 and the reverse side 10b of the wafer 10 that is determined by a Fourier transform of the spectral interference waveform indicating a spectral interference between the light reflected by the reverse side 10b of the wafer 10 and included in the reflected light L2 and the reflected light L3. The signal intensity waveform illustrated at the position (B) represents the distance between the lens 621 in the objective lens casing 62 and the face side 10a of the wafer 10 that is determined by a Fourier transform of the spectral interference waveform indicating a spectral interference between the light reflected by the face side 10a of the wafer 10 and included in the reflected light L2 and the reflected light L3. The signal intensity waveform illustrated at the position (C) represents the thickness of the wafer 10 that is determined by a Fourier transform of the spectral interference waveform indicating a spectral interference between the light reflected by the reverse side 10b of the wafer 10 and included in the reflected light L2 and the light reflected by the face side 10a of the wafer 10. Specifically, the calculating section 80 calculates the thickness of the wafer 10 as 1000 µm and the height of the face side 10a of the wafer 10 as a position represented by the thickness of the protective tape T and the thickness of the wafer 10, i.e., 1000 µm, added to the holding surface of the chuck table 25 as a reference.

As described above, the control unit 100 has been set such that the image capturing unit 60 according to the present embodiment is focused at a position that is spaced 5000 µm from the end 72a of the optical fiber 72 inserted in the minute hole 621b defined centrally in the convex lens 621a of the objective lens assembly 621. On the basis of the command signal from the automatic focusing controller 104 based on a value calculated by the calculating section 80, i.e., the height of the face side 10a of the wafer 10 or the thickness of the wafer 10, the control unit 100 actuates the automatic focusing mechanism 66 to lower the objective lens casing 62 by 1000 µm in order to set the distance between the end 72a of the optical fiber 72 and the face side 10a of the wafer 10 to 5000 µm, thereby focusing the image capturing unit 60 on the face side 12a of the wafer 10. In this manner, the position of the objective lens casing 62 can quickly be brought to a focused position according to the height or the thickness calculated by the calculating section 80 without the need for capturing images of the face side 10a of the wafer 10 respectively at predetermine pitches and determining differential values of sampled points at the predetermined pitches as in the conventional technique.

As described above, when the objective lens casing 62 is brought to the focused position, an image of the face side 10a of the wafer 10 is sharply captured by the camera 64, a region of the face side 10a to be processed, i.e., a projected dicing line 14, is well detected, and the position of the detected region is stored in the RAM of the control unit 100, whereupon the alignment process is completed. According to the present embodiment, since the end 72a of the optical fiber 72 is inserted in the minute hole 621b defined centrally in the convex lens 621a that faces the wafer 10 acts as a point light source, the light L1 spreads conically from the end 72a of the optical fiber 72 and is applied to the face side 10a of the wafer 10, no light is overlapped in the captured region and image contrast in the captured image is sharp, thereby, so that the alignment process is well carried out.

As described above, after the alignment process has been carried out and the position of the projected dicing line 14 to be processed has been detected and stored in the RAM of the control unit 100, the control unit 100 actuates the moving mechanism 30 to position the holding unit 20 directly below the beam condenser 42 of the laser beam applying unit 40. Then, the control unit 100 actuates the moving mechanism 30 and the laser beam applying unit 40 to process the wafer 10 along all the projected dicing lines 14 with a laser beam as predetermined on the basis of the positional information of the projected dicing lines 14 that is stored in the RAM of the control unit 100.

According to the above embodiment, it is not necessary to move the image capturing unit 60 with respect to the wafer 10 at predetermined pitches, capture images of the workpiece respectively at the predetermined pitches, and determine differential values with respect to the respective images in the alignment process. Instead, according to the above embodiment, the objective lens casing 62 can quickly be focused on the face side 10a of the wafer 10 on the basis of the height or the thickness calculated by the calculating section 80.

In the above embodiment, the image capturing apparatus 50 according to the present invention is mounted in the laser processing apparatus 1. However, the present invention is not limited to the illustrated image capturing apparatus 50. Rather, the present invention is also applicable to an image capturing apparatus mounted in another processing apparatus, e.g., a dicing apparatus for cutting a workpiece with a cutting blade.

In a case where a laser light source is used as the light source 74 in the above embodiment, the returning light (L2+L3) may be branched off by the beam splitter 81, and the intensity of an interference wave between the reflected light L3 reflected by the reflective surface 73a of the reflective film 73 on the end 72a of the optical fiber 72 and the reflected light reflected by the wafer 10 may be detected by a photodetector for measuring the height of the face side 10a of the wafer 10.

The present invention is not limited to the details of the above described preferred embodiment. The scope of the invention is defined by the appended claim and all changes and modifications as fall within the equivalence of the scope of the claim are therefore to be embraced by the invention.

What is claimed is:

1. An image capturing apparatus for capturing an image of a workpiece held on a chuck table, the image capturing apparatus comprising:
    a camera;
    an objective lens having a minute hole defined centrally therein and disposed in facing relation to the workpiece held on the chuck table;
    an optical fiber having an end located inside the minute hole in the objective lens;
    a light source optically coupled to another end of the optical fiber;
    a beam splitter disposed in the path of the optical fiber for branching off returning light reflected by the workpiece held on the chuck table;
    a computer for calculating a value representing a height or a thickness of the workpiece on a basis of the returning light branched off by the beam splitter, the computer communicatively coupled to the camera; and
    a focusing mechanism for focusing the objective lens on the workpiece on a basis of the value calculated by the computer.

2. The image capturing apparatus according to claim 1, wherein the light source is selected from a group consisting of a super luminescent diode light source, an amplified spontaneous emission light source, a super continuum light source, a light emitting diode light source, a halogen light source, a xenon light source, a mercury light source, a metal halide light source, and a laser light source.

3. The image capturing apparatus according to claim 1, further comprising:
    a diffraction grating for diffracting a spectral interference waveform of the returning light, and
    an image sensor for capturing an image of the light diffracted into wavelengths by the diffraction grating, the image sensor being communicatively coupled to the computer, and
    wherein the computer determines the height or the thickness of the workpiece by calculating intensities of the light respectively at the frequencies generated by the image sensor.

4. The image capturing apparatus according to claim 3, wherein the computer performs a waveform analysis according to a Fourier transform theory and a wavelet transform theory based on the spectral interference waveform and a theoretical waveform function to obtain a waveform of signal intensities to determine (a) a reverse side separation distance between the objective lens and the reverse side of the workpiece that is determined by a Fourier transform of the spectral interference waveform indicating a spectral interference between the light reflected by the reverse side of the workpiece, (b) a separation distance between the objective lens and the face side of the workpiece that is determined by a Fourier transform of the spectral interference waveform indicating a spectral interference between the light reflected by the face side of the workpiece, and (c) the thickness of the workpiece that is determined by a Fourier transform of the spectral interference waveform indicating a spectral interference between the light reflected by the reverse side of the workpiece and the light reflected by the face side of the workpiece.

5. The image capturing apparatus according to claim 4, wherein the computer is configured to send a signal to the focusing mechanism to adjust the position of the objective lens relative to the workpiece based on the determined height of the face side of the workpiece or the determined thickness of the workpiece.

6. The image capturing apparatus according to claim 5, wherein the position of the objective lens can be brought to a focused position according to the determined height or the determined thickness calculated by the computer without the need for capturing images of the face side of the wafer respectively at predetermined pitches and determining differential values of sampled points at the predetermined pitches.

7. The image capturing apparatus according to claim 1, wherein the optical fiber has an outer diameter of 50 μm and the minute hole has a diameter of 51-53 μm.

8. The image capturing apparatus according to claim 7, wherein the end of the optical fiber inserted in the minute hole in the objective lens has a ring of reflective film disposed thereon, the ring having a circular opening defined centrally therein having a diameter of 30 μm, the ring of reflective film having a reflective surface for reflecting light from the light source into the optical fiber;
    the optical fiber further receiving light reflected from the reflective surface of the reflective film, the light reflected from the reflective surface of the reflective film acting as a reference not affected by a distance between the workpiece 10 and the objective lens.

9. The image capturing apparatus according to claim 1, wherein the objective lens is disposed in a moveable objective lens casing; and
    wherein the focusing mechanism comprises a stepping motor and a threaded rod engaging a threaded surface coupled to the objective lens casing, wherein the operation of the stepping motor changes the distance between the objective lens and the workpiece, wherein a focusing controller is communicatively coupled to the stepping motor.

10. The image capturing apparatus according to claim 9, wherein the computer comprises the focusing controller.

11. The image capturing apparatus according to claim 9, wherein the camera preset to be focused at a position 5000

μm from an end face of the objective lens casing and the focused position in stored in memory of the computer.

12. The image capturing apparatus according to claim 1, wherein the computer comprising a memory for recording images captured by the camera.

13. The image capturing apparatus according to claim 1, wherein the end of the optical fiber inserted in the minute hole in the objective lens acts as a point light source whereby light spreads conically from the end of the optical fiber and is applied to the face side of the workpiece, whereby no light is overlapped in a captured region and image contrast in the captured image is sharp.

14. The image capturing apparatus according to claim 1,
wherein the workpiece has face side and a reverse side;
wherein the optical fiber is positioned to direct visible light from the light source to the workpiece and to receive light reflected from the face side and the reverse side of the workpiece; and
wherein the camera is configured to detect visible light reflected from the workpiece through the objective lens.

\* \* \* \* \*